United States Patent [19]

Davis

[11] Patent Number: 4,881,340
[45] Date of Patent: Nov. 21, 1989

[54] FISHING LURE WITH DOUBLE-WALLED ANNULAR REGION HAVING PLURAL PASSAGES

[75] Inventor: F. Darell Davis, West Columbia, S.C.

[73] Assignee: American Angler Corporation, Columbia, S.C.

[21] Appl. No.: 295,909

[22] Filed: Jan. 11, 1989

[51] Int. Cl.[4] ............................................. A01K 85/00
[52] U.S. Cl. ................................. 42/42.06; 43/42.09; 43/42.15; 43/42.23; 43/42.32; 43/42.33; 43/42.35
[58] Field of Search ...................... 43/42, 42.06, 42.09, 43/42.11, 42.15, 42.22, 42.23, 42.31, 42.32, 42.33, 42.35, 44.99

[56] References Cited

U.S. PATENT DOCUMENTS

| D. 296,123 | 6/1988 | Davis | D22/126 |
|---|---|---|---|
| 1,645,874 | 10/1927 | Sanford | 43/42.06 |
| 2,229,369 | 1/1941 | Buettner | 43/42.06 |
| 2,502,562 | 4/1950 | Fike | 43/42.32 |
| 2,529,642 | 11/1950 | Vaugn et al. | 43/42.35 |
| 2,538,459 | 1/1951 | Kasmeyer | 43/42.06 |
| 2,556,634 | 6/1951 | Rdinger | 43/41 |
| 2,627,134 | 2/1953 | Fitzgerald | 43/42.06 |
| 2,714,779 | 8/1955 | Heiner | 43/42.33 |
| 2,769,268 | 11/1956 | Miller | 43/42.06 |
| 2,817,180 | 12/1957 | Thomas | 43/42.06 |
| 2,846,805 | 8/1958 | Waitzman | 43/42.06 |
| 2,948,982 | 8/1960 | Galpin | D22/126 X |
| 3,040,465 | 6/1962 | Gierat | 43/42.06 |
| 3,269,050 | 8/1966 | Garwood | 43/42.33 |
| 3,367,059 | 2/1968 | Puls et al. | 43/42.09 |
| 3,367,060 | 2/1968 | Abercrombie | 43/42.06 |
| 3,423,868 | 1/1969 | Le Master | 43/42.15 |
| 3,449,852 | 6/1969 | Mitchell | 43/42.06 |
| 3,585,749 | 6/1979 | Dieckmann | 43/42.06 |
| 3,705,465 | 12/1972 | Charney | 43/42.06 |
| 3,768,195 | 10/1973 | Proietti | 43/42.33 |
| 3,895,455 | 7/1975 | Johnston | D22/126 X |
| 4,102,075 | 7/1978 | Wagner et al. | 43/42.06 |
| 4,176,490 | 12/1979 | Philips | 43/42.15 |
| 4,231,179 | 11/1980 | Hillesland | 43/42.06 |
| 4,266,360 | 5/1981 | Smith | 43/42.09 |
| 4,345,399 | 8/1982 | Guzik | D22/126 X |

Primary Examiner—Nicholas P. Godici
Assistant Examiner—William Scott Andes
Attorney, Agent, or Firm—Dority & Manning

[57] ABSTRACT

The present invention generally concerns a fishing lure having a hollow body comprising inner and outer tubular members with an annular space therebetween. A plurality of attachment points permit the fishing lure to be drawn through water in a variety of orientations. In addition, modular attachment elements cooperate with the basic lure to comprise a clip-on system of members which may be assembled in selected configurations, resulting in resemblance to different baits. Light variously transmitted through the outer tubular member may be reflected by an inner tubular member to enhance alluring effects. Additionally, various openings in communication with the annular space permits transmission of air bubbles and water therethrough, for further enhanced alluring effects.

19 Claims, 4 Drawing Sheets

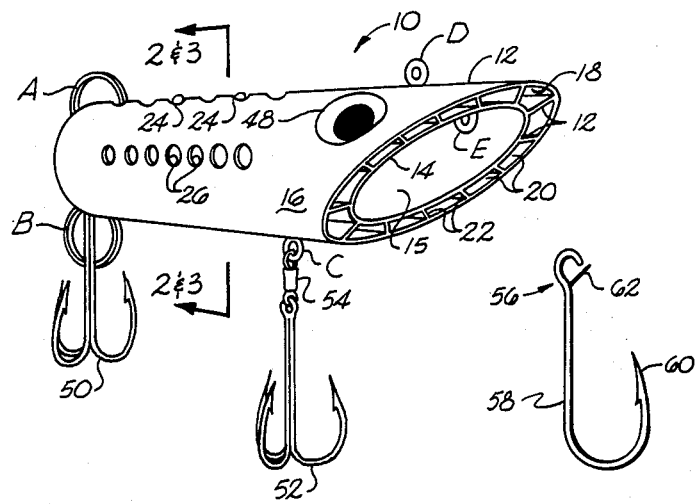
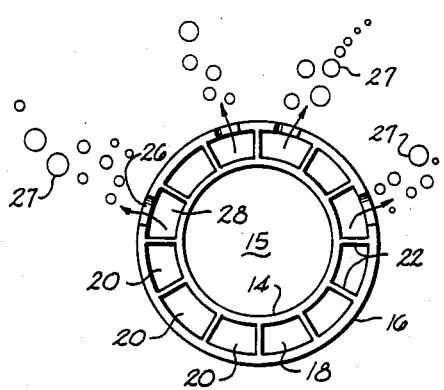
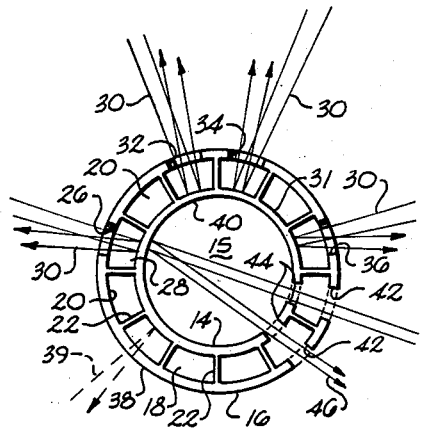
Fig. 1A    Fig. 1B
Fig. 2    Fig. 3

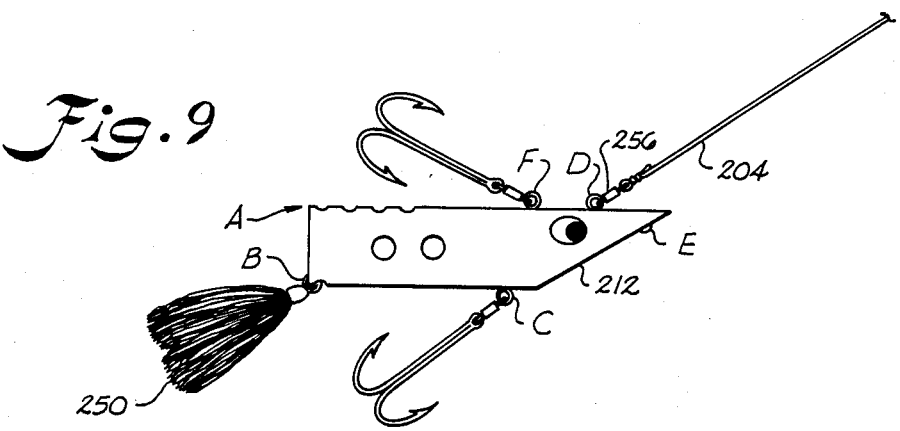
Fig. 9
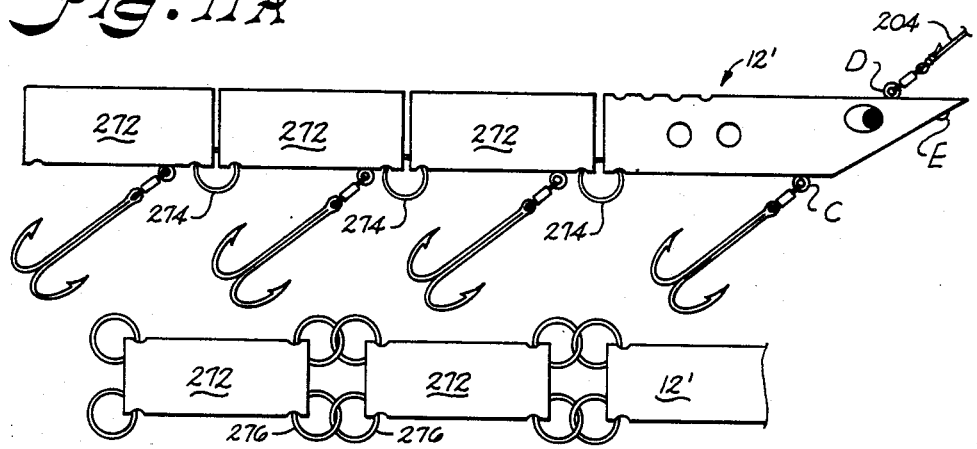
Fig. 11A
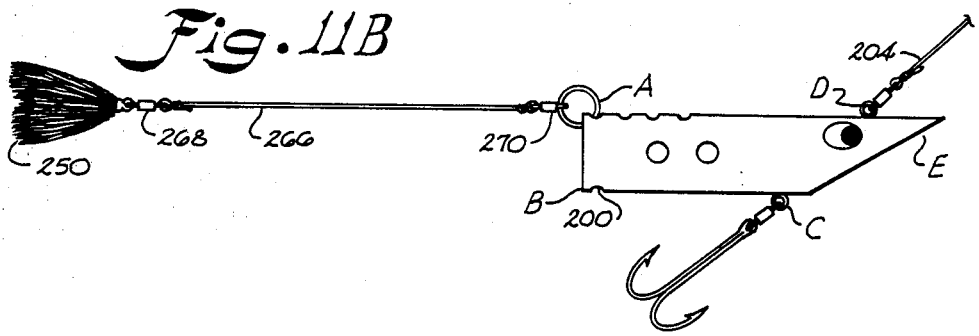
Fig. 11B
Fig. 10

FISHING LURE WITH DOUBLE-WALLED ANNULAR REGION HAVING PLURAL PASSAGES

BACKGROUND OF THE INVENTION

The present invention relates generally to fishing lures and more particularly to a lure (and, optionally, accessories therefor) of novel form and arrangement which may be used in varying configurations and/or orientations to attract the attention of a large variety of fish. The invention also pertains to a modular fishing lure system.

Many fishing lures presently available on the market and in use by fishermen of varying degrees of proficiency are intended as a single purpose type, wherein a given type fishing lure will have characteristics (for example, such as habits, movements, and behavior patterns) attributed to certain species of fish. Such practices require that a considerable number of different types of lures be made available in a fisherman's gear or tackle box in order to have available corresponding options for the particular species of fish that might be encountered or sought. If a wide variety of species of fish are anticipated, such typical restrictions on intended lure uses can be relatively expensive due to the necessity of purchasing plural lures, as well as time consuming in devising or preparing a given fishing rig at a moments notice. Another aspect of plural lure usage is that great care is required to insure that no entanglement of the components of fishing lures and rigs occurs within the tackle box.

Since typical precautions for fishing with artificial bait normally involves use of assorted materials, it is not uncommon for a significant amount of advance time or time at a fishing location to be consumed in actually tying up or rigging a given lure. Such rigging may involve tying lead lines of various types, and attaching hooks or other elements, any of which operations may necessitate knot-tying proficiency. Already difficult tying jobs or rigging problems may be made more difficult by in-the-field poor weather and/or lighting conditions.

While it is generally known that it is desirable for artificial bait to generate alluring effects through sight, sound, and even smell stimuli, obtaining desired results is an area of widespread claims and debates which has further resulted in proliferation of lure types and designs, exacerbating the problems and disadvantages noted above.

SUMMARY OF THE INVENTION

In order to obviate the disadvantages and restrictions enumerated above, one object of the present invention is to enhance flexibility in using a single fishing lure to enable the same to be utilized by a fisherman for attracting a large variety or species of fish.

Another general object of the present invention is to enhance the alluring effect of a fishing lure. A more specific object is to provide improved visual, sound, and/or scent attractions.

Another object of the invention is to increase the flexibility of a fishing lure for a greater variety of species of fish, by providing a modular fishing lure system which may be utilized in various configurations and orientations for differing reactions (i.e., behavior) in water.

While various specific exemplary features are disclosed and discussed herewith, it is to be understood that those of ordinary skill in the art will appreciate various modifications and variations which may be practiced without departing from the spirit and scope of the present invention. Such variations include, but are not limited to, substitution of equivalent features and elements for those shown or suggested, and the reversal of locations or functions of various present features and elements.

Additionally, it is to be understood that those of ordinary skill in the art may practice differing combinations and/or collections of presently disclosed features and elements as embodiments of this invention. One exemplary configuration forming an exemplary embodiment of this invention concerns a fishing lure having a hollow generally longitudinal body comprising an inner tubular member and an outer tubular member spaced outwardly therefrom to define an annular space therebetween extending along the length of the body, such body being formed for varying orientation thereof as same is drawn through water, and such outer tubular member being formed with at least one opening transversely thereof for allowing water and air bubbles to escape outwardly from within the annular space.

Another present exemplary embodiment is a fishing lure having a hollow longitudinal body comprising an inner tubular member and an outer tubular member spaced outwardly therefrom to define an annular space therebetween extending along the length of the body, such body being formed with a diagonal forward edge for varying orientation thereof as the same is drawn through water, a plurality of channels formed in the annular space and extending along the length of the tubular members for effecting the release of air bubbles from within the annular space and aiding the alluring effect, and means for attaching a fishing line to one area of the body and one or more modular fish hooks or other modular accessories at other areas thereof.

Still another exemplary embodiment of this invention is directed to a modular fishing lure system comprising a hollow longitudinal body including an inner tubular member and an outer tubular member spaced outwardly therefrom to define an annular space therebetween extending along the length of the body, the body being formed at its forward end with a diagonal forward edge and adapted for varying orientation thereof as same is drawn through water, and a plurality of attachment means for selectively attaching modular accessories to differing areas of the body; removable modular tail sections adapted for attachment to the body; and modular accessories including hooks, lead line attachments, and trailer attachments, having integral clip means for selected attachment to respective attachment means on the body in desired configurations. Such a modular fishing lure system in essence comprises a clip-on system of members which may be assembled in selected configurations and drawn through the water in selected orientations to resemble different baits.

Additional objects and aspects of the present invention will be apparent form the remainder of this specification.

BRIEF DESCRIPTION OF THE DRAWINGS

A full and enabling disclosure of the present invention, including the best mode thereof, to those of ordinary skill in the art is set forth in the following description taken in conjunction with the accompanying drawings, in which:

FIG. 1A is a perspective view of an exemplary fishing lure in accordance with the present invention;

FIG. 1B is an isolated view of a modular hook member (clip open) in accordance with the present invention for use therewith;

FIGS. 2 and 3 are cross-sectional views of the fishing lure of FIG. 1A taken along lines 2—2 and 3—3 thereof, and illustrating various attraction effects of the invention;

FIGS. 9, 10, 11A, and 11B are side elevational views of a present exemplary lure showing different arrangements (i.e., configurations) of modular accessories therewith, in accordance with the present invention.

Figure 4:
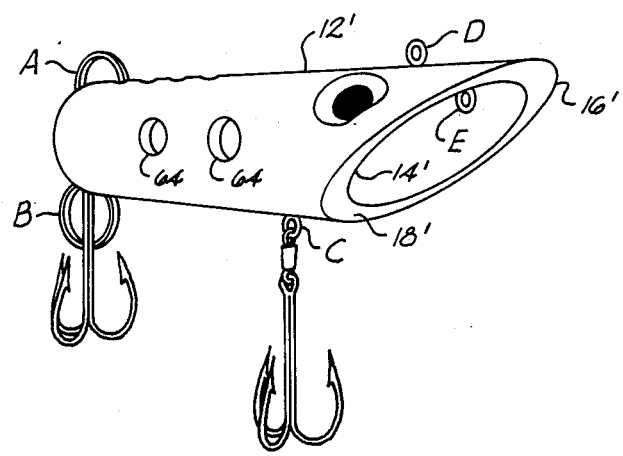
FIG. 4 is a perspective view of a lure showing an alternate embodiment of this invention.

Repeat use of reference characters in the following specification and accompanying drawings is intended to represent same or analogous features or elements of the present invention.

DETAILED DESCRIPTION OF THE PREFERRED EMBODIMENTS

Those of ordinary skill in the art will appreciate, that the following specific features and description are intended by way of example only, and are not intended to limit the broader present teachings embodied thereby. In a first exemplary embodiment as shown in FIGS. 1A, 1B, 2, and 3, a fishing lure 10 provided as in accordance with the present invention comprises a generally longitudinal hollow body 12 formed by an inner shell or tubular member 14 extending longitudinally of the body with a hollow core 15, and an outer shell or tubular member 16 arranged spaced from and concentric with inner member 14 to define a generally annular space 18 therebetween.

Within annular space 18 a plurality of tubes or channels 20 are arranged radially of the axis of body 12 and extend preferably along the full length thereof. The cross-sections of such channel means may assume different shapes and are separated from each other by (i.e., defined by) walls 22 oriented radially relative to body 12 and extending between the outside diameter of inner tubular member 14 and the inside diameter of outer tubular member 16. A hole or holes 24 may be formed in outer shell 16 along strategic points thereon, which are in communication with one or more of the channels 20. For example, a series of holes 26 formed in shell 16 as represented in Figure 1A are in communication with a specific exemplary longitudinal region 28. As represented in FIG. 2, holes 26 serve to allow water and air bubbles 27 to pass from the interior of their associated channels, thereby producing alluring effects for fish as the lure is being drawn through water, including side-to-side movements of the lure body.

As represented in FIG. 3, transverse openings through the periphery of tubular member 16, such as holes 26, also serve to permit the reflection of light (as represented by light lines 30) from outside diameter 31 of inner tubular member 14, and thereby enhance the alluring effect the lure may present to fish which are encountered during the drawing of the lure through water. While only one series of holes 26 have been illustrated relative to a single channel 28, the illustrations in FIGS. 2 and 3 show plural series of holes (of various sizes, shapes, and numbers) 32, 34, and 36 which may be formed in an outer tubular member 16 for the purposes and functions just described.

In addition to the foregoing represented use of holes 26, 32, 34, and 36 for creating visual attraction through light reflection from surface 31, the present invention provides additional visual attraction features through other types of light reflection. For example, outer tubular member 16 may comprise at least partially translucent material for transmitting some light therethrough, to be reflected by inner tubular member 14, preferably comprising in such instance relatively reflective material, for example such as chromium. FIG. 3 represents one such translucent region 38 of tubular member 16, reflecting light 39 in such fashion.

Still in addition to the foregoing, light may be reflected from the inside diameter 40 of inner tubular member 14, by providing plural respectively aligned transverse openings in the inner and outer tubular members. See for example FIG. 3 and the representative features illustrated therein, including openings 42 in tubular member 16, openings 44 in tubular member 14, and reflected light line 46. Various combinations of such light reflective features may be practiced in different embodiments in accordance with the present invention. It is also expected that those of ordinary skill in the art may variously configure such present features to accommodate particular design criteria as from time to time encountered by such users. Also, it is expected that those of ordinary skill in the art will make minor modifications and variations to the present exemplary embodiment without departing from the spirit and scope thereof. For example, FIG. 1A illustrates a painted or applied decal representing an eye 48. Other markings and the like may also be variously applied as desired, while practicing the present invention.

Additional aspects of various embodiments of the present invention are represented in FIGS. 1A and 1B. For example, hollow body 12 may further include a plurality of means for attaching a fishing line, fish hook, or accessory at various locations of body 12. In this instance, such attachment means comprise five separate members or hackle points A, B, C, D, and E. While points C, D, and E are represented by relatively fixed members, points A and B may comprise freely movable rings (i.e., rattle rings), which cause vibrations which are relatively amplified by hollow body 12 to produce sonic attraction features.

In accordance with the present modular fishing lure system concepts, a variety of accessories may be removably attached to any one of such points A through E. Figure 1A illustrates triple hook members 50 and 52 associated with hackle points B and C, respectively. Such hooks may be of selected size and type (e.g., single or triple). While separate clips per se (such as exemplary clip 54) are generally known, it is a preferred feature of the present invention to use the present integral clip means 56, such as integrally incorporated into one end of hook 58 (having a barb 60 incorporated integrally into another end thereof) for removably attaching present modular accessories to the various attachment means supported on the lure body 12.

Integral clip means 56, variously used with different modular accessories, permits a clip-on type system of members which may be assembled in selected configurations and drawn through water in selected orientations so as to resemble different baits, as discussed below in conjunction with representative FIGS. 5 through IIB. Moreover, integral clip means 56 may assume various configurations, but a clip integrally formed with the body of the modular accessory and having a closable member 62 is one preferred arrangement, all as represented in present FIG. 1B. Such clip means 56 may be incorporated into or otherwise used with other present modular accessories.

In the alternative embodiment shown in FIG. 4, a pair of holes 64 are shown as being concentrically aligned and formed respectively in both the inner and outer tubular members 14' and 16' of an alternate lure body 12' in accordance with the present invention. Such holes also permit the release of water and air bubbles from within annular space 18' to increase the attention gathering and alluring effect the lure provides for fish within the vicinity thereof. Any or all of the features of Figure IA, such as the series of holes 32, 34, 36, 42, and 44, may be utilized in the FIG. 4 embodiment, such as for the release of material having a fish attracting scent to aid in the allure which the lure will provide. For example, the series of holes 32 may permit introduction of conventional fish attracting scent materials which will flow down the channels between the inner and outer members 14' and 16', thereby providing a longer than usual time during which the scent is effective for alluring fish. In the past such application of materials having a fish attracting scent was often to surfaces of the lure, thereby rendering the surface treatment vulnerable to the turbulent movement of water and shortening its effective life.

The body 12' of FIG. 4 again preferably provides a plurality of hackle hook-up stations or attachment means A, B, C, D, and E arranged to permit the orientation of the lure at various angles as it is drawn through the water, thereby producing a variety of reactions in the water suitable for attracting various fish. In addition, the hackle stations A through E provide an arrangement for the use of a considerable variety of modular accessories and the addition of modular tail sections (which may be added to the main body of the lure). FIGS. 5 through 8 represent various lead line attachment orientations, while FIGS. 9, 10, 11A, and 11B represent various associations and arrangements of modular members of the present modular fishing lure system. Repeat discussion of details of FIGS. 4 through 11B common to those details discussed in conjunction with FIGS. 1A, 1B, 2, and 3, is not considered necessary for a full and adequate understanding of such figures. Additionally, it is to be understood that clip means 56, such as represented in present FIG. 1B, may be optionally practiced with any of the modular accessories otherwise illustrated, and in any lure body location thereof.

Referring to FIGS. 5 through 8, each such figure has respective attachment means or hackle points A, B, C, D, and E thereof similarly labeled, so that those of ordinary skill in the art can appreciate the different potential lead line attachment points which may be practiced with the present invention. As generally represented in present FIG. 5, it is preferred that lure body 12' be formed with a forward diagonal edge 100 having attachment means E arranged at a point along body 12' spaced from the apex 102 of the diagonal forward edge 100. Such edge, in conjunction with the concentric tubular member and hollow core construction of the present lure body results in various reactions of the lure when being drawn through water, depending on which attachment means is secured to a lead line 104.

Figure 5:
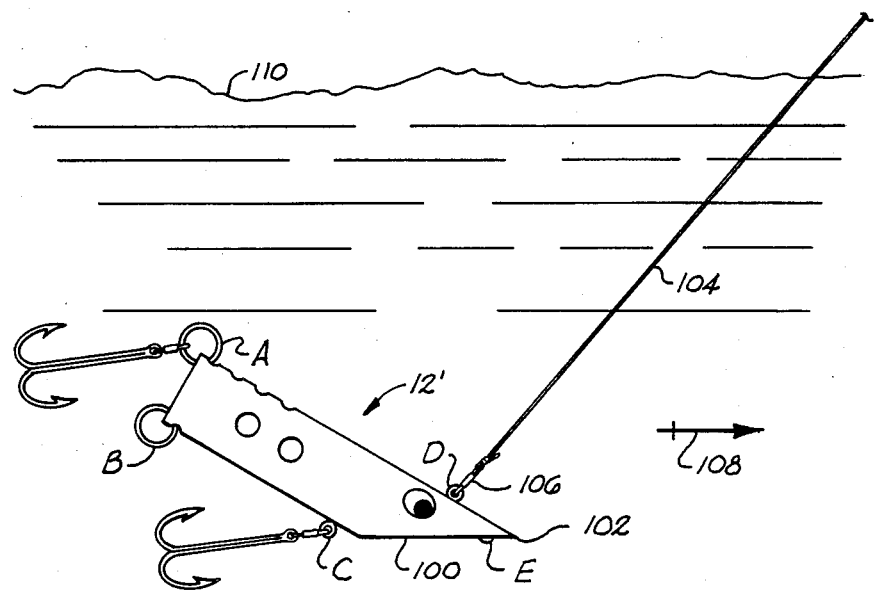
FIGS. 5 through 8 are side elevational views of the present exemplary lure of FIG. 4 representing various reactions of such lure when drawn through water upon alternate rigging (i.e., orientation) of same.

FIG. 5 represents an orientation, or rigging, of lure body 12' with lead line 104 attached through clip means 106 (which may comprise means similar to clip means 56 of present FIG. 1B, other constructions) connected to attachment means D located along the top forward edge of the lure. With such arrangement, a generally downward force is applied by water across the top of the lure as it is drawn generally forward in the water in the direction of arrow 108. Such forces cause the lure oriented such as illustrated in present FIG. 5 to run relatively deep beneath the surface 110 of the water.

Figure 6:
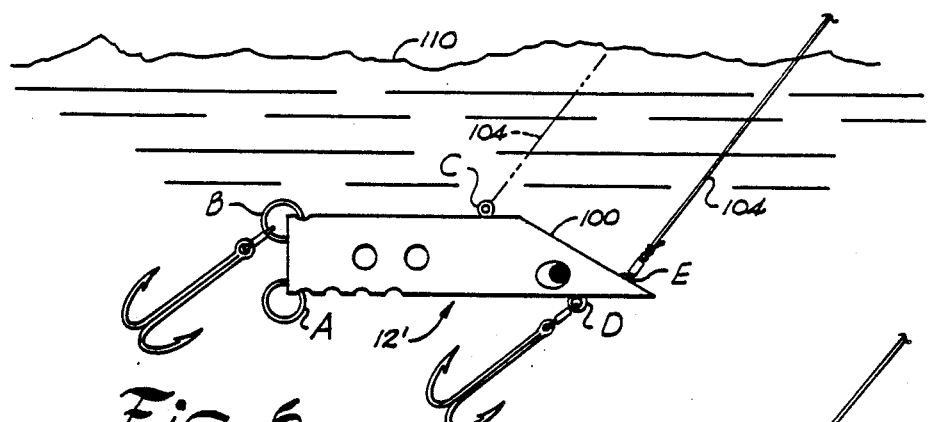

On the other hand, rig orientations with lead line 104 attached to either hackle points C or E (FIG. 6) permit the lure body to run closer to surface 110, as represented by such FIG. 6. If the lead line is connected to hackle point C, the force of water against forward diagonal edge 100 would tend to pivot the rearend of the body slightly upward about such point C, whereas the resulting draw through water when attached to point E is generally more as illustrated in solid line in present FIG. 6.

Figure 7:
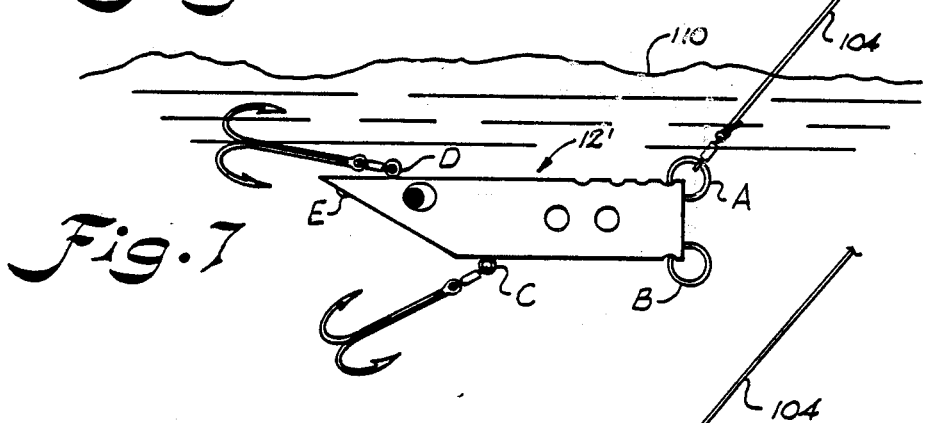
Figure 8:
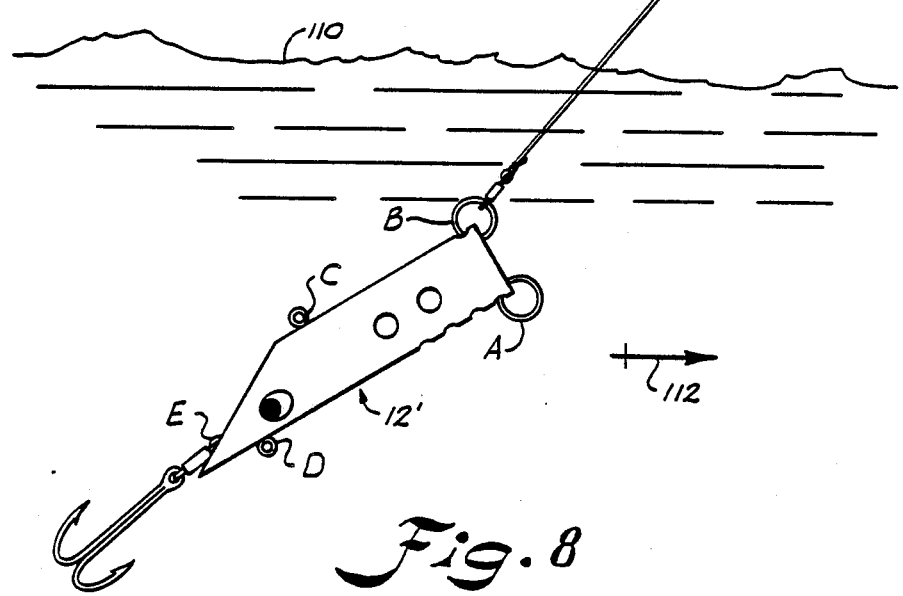

FIGS. 7 and 8 illustrate "reverse" orientation or rigging of the lure to represent such bait as crawfish, shrimp, or the like. As illustrated, one or the other of the rearward rattle rings A or B may be utilized for lead line attachments. Rattle rings may comprise various removable constructions. In general, when pulled in a rearward direction such as generally indicated by arrow 112 in present FIG. 8, trapped air or moving water through portions of the lure body tend to have greater influence over the reaction of the lure than does the forward diagonal edge 100 thereof. Thus, the speed of retrieval of the lure will have some affect on its running depth beneath water surface 110.

As variously represented by FIGS. 5 through 8, once a given attachment means is selected for securement of a lead line thereto, various other of the remaining attachment means may be selected for securement of hooks or the like thereto. Preferably, such hooks are modular members incorporating clip means such as represented in present FIG. 1B. It is to be understood that those of ordinary skill in the art practicing the present invention will be expected to select different configurations of such accessories relative to the main lure body 12' and the preferably five attachment points thereof, even including combinations and configurations of members not illustrated, as well as orientations and retrieval patterns not specifically illustrated.

In addition to the foregoing exemplary alternative orientations and configurations, additional modular accessories may be utilized with the mn lure body, in accordance with the present invention. Additional such variations are represented by present FIGS. 9, 10, 11A, and 11B.

In exemplary present FIG. 9, a lure body 212 constructed in accordance with the present invention is removably attached to a lead line 204 through clip means 256 at attachment means position D. Rattle rings found in positions A and B of previous exemplary embodiments are omitted in the FIG. 9 configuration in favor of a smaller attachment at position B, which supports a hook arrangement 250 with a feather tail, rubber skirt, or the like secured to such clip-on hook. Additional hooks are otherwise secured, such as at regular position C, and at another optional position F diametrically opposite position C. No modular accessory is illustrated as attached at position E.

The FIG. 10 configuration is relatively similar to that of FIG. 9, in that a lead line 204 is attached at attachment means position D, no member is attached at attachment means position E, and a hook member is attached at attachment means position C. However, there is no sixth attachment means position F, as in FIG. 9, and there are some differences with respect to attachment means positions A and B. Specifically, there is no specific member added to the position of attachment means B, though an opening 200 adjacent such position may be regarded as one alternative form of an attachment means in accordance with the present invention. The attachment means at position A once again comprises a rattle ring arrangement, in this instance having a trailer line 266, with clip means 268 and 270 on each end thereof interconnecting between such rattle ring and a shrouded clip-on hook member 250. It is intended as apparent to those of ordinary skill in the art, that various combinations of such modular accessories, including different positions and uses of modular trailer line 266, may be practiced as desired, to provide different effects and resemblances to different types of bait.

FIGS. 11A and 11B both relate to optional use of modular accessories comprising optional tail members 272. While various constructions may be practiced, it is generally preferred that optional tail members 272 comprise generally longitudinal, hollow bodies with inner and outer tubular members concentrically related to one another, generally as represented in FIGS. 1A, 2, and 3 for lure body 12. As is apparent from the figures, it is not generally preferred that such tail assemblies be provided a forward diagonal edge, as is the case with exemplary bodies 12 and 12'. Both configurations, as in FIGS. 11A and 11B, may be used in jointed fashion to represent snakes, eels or the like, being drawn along by a lead line 204 attached in a position D. Otherwise, in FIG. 11A, a single rattle ring 274 is used to removably interconnect the modular assemblies, i.e. as situated between given adjacent modular members, whether referring to a pair of tail assemblies 272, or a tail assembly and basic lure body. In the FIG. 11B exemplary configuration, double pairs of rattle rings 276 are utilized for interconnecting adjacent modular members, so as to provide enhanced sound and vibration for even further improved sonic attraction effects.

While specific exemplary configurations and orientations of the present inventions have been illustrated, it is to be understood that numerous other modifications and variations to such may be practiced in accordance with the present invention, particularly as relates to the modular fishing lure system features hereof. In addition, substitutions and changes of positions for various of the illustrated modular accessories may be practiced. Any and all modular accessories may variously incorporate the integral clip means 56 such as represented in present FIG. 1B. Also, additional accessories other than those specifically illustrated may be provided, and may optionally incorporate such clip means, so as to be utilized with the present invention as part thereof.

The foregoing specific illustrations and discussion is intended as exemplary only, and is not intended as words or illustrations of limitation to the present invention, which is further set forth in the following claims.

What is claimed is:

1. A fishing lure having a hollow generally longitudinal body comprising an inner tubular member and an outer tubular member spaced outwardly therefrom to define an annular space therebetween extending along the length of said body, said body being formed for varying orientation thereof as same is drawn through water, and said outer tubular member being formed with at least one opening transversely thereof for allowing water and air bubbles to escape outwardly from within said annular space, said lure further including a plurality of channel means, positioned in said annular space and extending along the length of said tubular members, for enhancing release of air bubbles and aiding the alluring effect.

2. The fishing lure defined in claim 1 wherein said channel means comprise longitudinal regions defined in said annular space by a plurality of walls extending generally longitudinally therein, and between the outside diameter of said inner tubular member and the inside diameter of said outer tubular member.

3. The fishing lure defined in claim 1 wherein said outer tubular member is formed with a plurality of transverse openings for permitting the outward reflection of light from the outside diameter of said inner tubular member.

4. The fishing line defined in claim 1 wherein said inner and outer tubular members include a plurality of respectively aligned transverse openings for permitting the outward reflection of light from the inside and outside diameters of said inner tubular member.

5. The fishing lure defined in claim 1, wherein said outer tubular member comprises a translucent material for at least partially transmitting light therethrough, and said inner tubular member comprises a highly reflective material for efficiently reflecting light therefrom.

6. The fishing lure defined in claim 5, wherein said inner tubular member has a chromium reflective surface, and said outer tubular member translucent material is tinted for colorized effects.

7. The fishing lure defined in claim 1 wherein said body further includes a plurality of means for attaching a fishing line, fish hook, or accessory at various locations of said body.

8. The fishing lure defined in claim 7, wherein said body is formed with a forward diagonal edge, and one of said means for attaching a fishing line is arranged at a point along said body spaced from the apex of said diagonal forward edge, whereby a force is developed between said point and said apex to drive the lure deeper in the water as it is drawn through the water.

9. The fishing lure defined in claim 7, wherein said plurality of means for attaching are adapted for receipt of lip-on removable modular accessories, including lead lines, trail lines, hooks, and tail sections, and said fishing lure further includes at least one of such modular accessories attached to at least one of said means for attaching thereof.

10. The fishing lure defined in claim 10, wherein said modular accessory includes integrally therewith clip means for removably attaching said accessory to said fishing lure body.

11. The fishing lure defined in claim 11, wherein said modular accessory comprises a hook with at least one barb integrally formed on one end thereof and a closable clip integrally formed on an opposite end thereof.

12. A fishing lure having a hollow longitudinal body comprising an inner tubular member and an outer tubular member spaced outwardly therefrom to define an annular space therebetween extending along the length of said body, said body being formed with a diagonal forward edge for varying orientation thereof as the same is drawn through water, a plurality of channels formed in said annular space and extending along the length of said tubular members for effecting the release of air bubbles from within said annular space and aiding the alluring effect, and means for attaching a fishing line to one area of said body and one or more modular fish hooks or other modular accessories at other areas thereof.

13. The fishing lure defined in claim 12, wherein said outer tubular member includes openings through the periphery thereof in communication with said channels for permitting the deposit therein of material having fish attracting scent, the passage of air and water therethrough, and the transmission of light reflected from said inner tubular member, all of which enhances the attracting effects of said fishing lure.

14. The fishing lure defined in claim 12, wherein said means for attaching a fishing line includes at least one fixed member arranged at a point along said body spaced from the apex of said diagonal forward edge, whereby during drawing of said lure through water with a lead line attached to said fixed member, a force is developed between said point and said apex to drive the lure deeper in the water.

15. The fishing lure defined in claim 12, further including at least one modular tail section, attachable to the rearward end of said body and comprising an inner tubular member and an outer tubular member surrounding the latter to define an annular space therebetween.

16. A modular fishing lure system, comprising:
a hollow longitudinal body including an inner tubular member and an outer tubular member spaced outwardly therefrom to define a annular space therebetween extending along the length of said body, said body being formed at its forward end with a diagonal forward edge and adapted for varying orientation thereof as same is drawn through water, and a plurality of attachment means for selectively attaching modular accessories to differing areas of said body;

said annular space including a plurality of channels positioned therein and extending along the length of said tubular members for enhancing release of air bubbles and water to aid the alluring effect of said system;

removable modular tail sections adapted for attachment to said body; and modular accessories including hooks, lead line attachments, and trailer attachments, having integral clip means for selected attachment to respective attachment means on said body in desired configurations;

whereby said modular fishing lure system comprises a clip-on system of members which may be assembled in selected configurations and drawn through water in selected orientations to resemble different baits.

17. A modular fishing lure system as in claim 16, wherein said outer tubular member includes openings in communication with said channels for permitting the passage of air bubbles and water therethrough, and for permitting the outward reflection of light from said inner tubular member.

18. A modular fishing system as in claim 16, wherein said outer tubular member comprises at least partially translucent material for transmitting some light therethrough, and said inner tubular member comprises reflective material for reflecting light transmitted through said outer tubular member, whereby such reflected light adds to the alluring effect of said lure system.

19. A modular fishing lure system as in claim 16, wherein said inner and outer tubular members include a plurality of respectively aligned openings in the periphery thereof for permitting the passage of light therethrough, including reflections of light from the inside and outside diameters of said inner tubular member.

* * * * *